March 15, 1949.  D. H. SMITH, JR  2,464,535
MOTOR VEHICLE PASSING SIGNAL

Filed Aug. 22, 1947  2 Sheets-Sheet 1

INVENTOR.
DAVID H. SMITH, JR.
BY
McMorrow, Berman & Davidson
ATTORNEYS

March 15, 1949. D. H. SMITH, JR 2,464,535
MOTOR VEHICLE PASSING SIGNAL
Filed Aug. 22, 1947 2 Sheets-Sheet 2
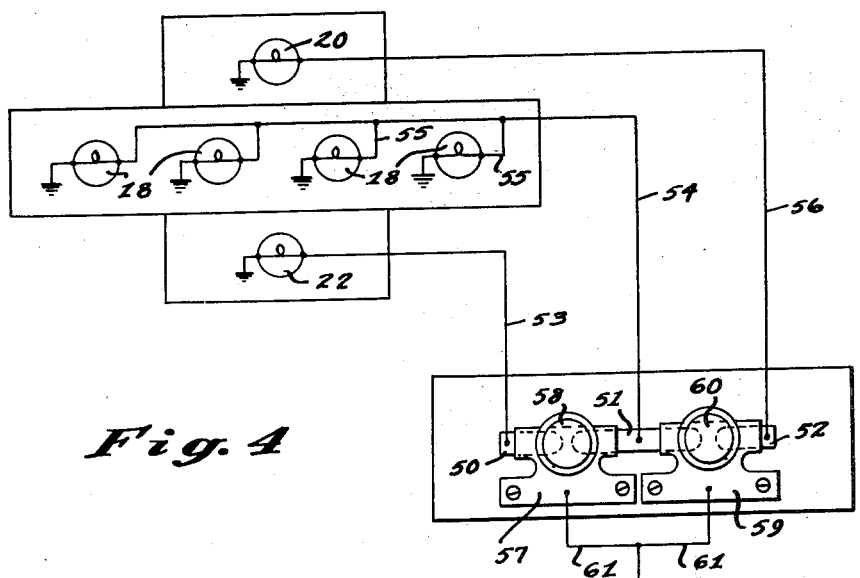
Fig. 4
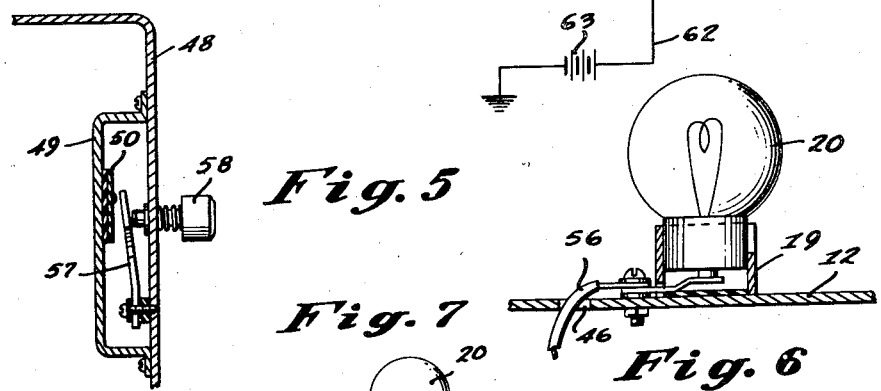
Fig. 5
Fig. 7
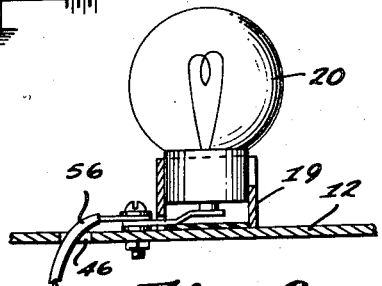
Fig. 6
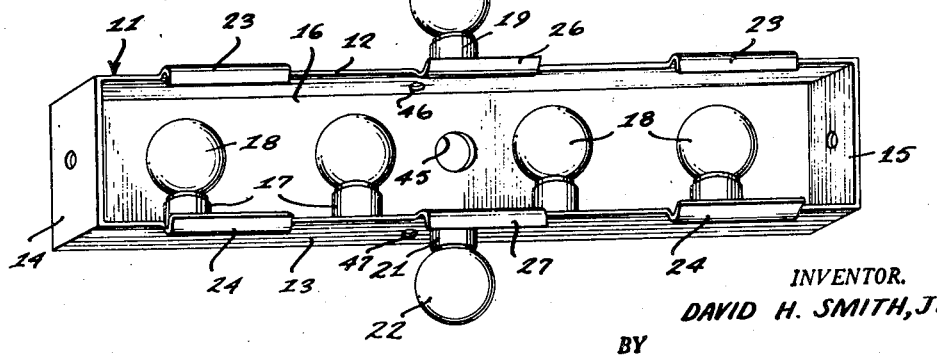
INVENTOR.
DAVID H. SMITH, JR.
BY
McMorrow, Berman & Davidson
ATTORNEYS Patented Mar. 15, 1949

2,464,535

UNITED STATES PATENT OFFICE 2,464,535

MOTOR VEHICLE PASSING SIGNAL

David H. Smith, Jr., Wyanet, Ill.

Application August 22, 1947, Serial No. 770,107

3 Claims. (Cl. 177—327)

1

This invention relates to signal devices and more particularly to a signal device adapted to be installed on the rear portion of a motor vehicle and arranged for operation by the driver of the vehicle to warn other vehicles behind the first vehicle as to whether road conditions ahead are safe for passing.

A main object of the invention is to provide a novel and improved passing signal device for motor vehicles which is very simple in construction, easy to install, and which substantially reduces the hazards involved when one vehicle passes another vehicle on a narrow road.

A further object of the invention is to provide an improved motor vehicle passing signal device which is inexpensive to manufacture, neat in appearance, and very easy to operate by the driver of the vehicle so as to indicate the safe or unsafe condition of the road ahead to a rearward vehicle desiring to pass the first vehicle.

Further objects and advantages of the invention will become apparent from the following description and claims, and from the accompanying drawings, wherein:

Figure 4 is an electrical circuit diagram of the signal unit and control means therefor according to the present invention.

Figure 5 is a transverse cross-sectional detail view taken through the dashboard of a motor vehicle showing a push button switch for controlling the passing signal of the present invention.

Figure 6 is an enlarged cross-sectional detail view taken through a wall of the inner housing of the signal unit of Figure 1 and showing the method of making electrical connections to a signal lamp.

Figure 7 is a perspective view of the inner subassembly of the signal unit of Figure 1.

Figure 1:
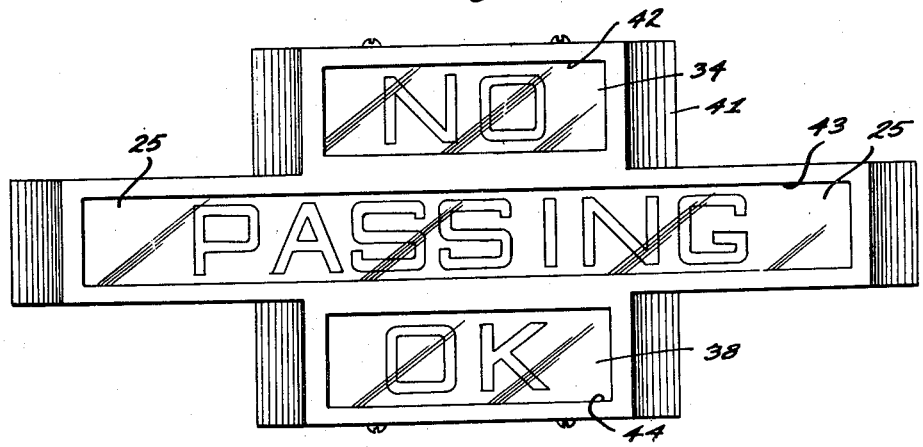
Figure 1 is an elevational view of a completely housed passing signal unit constructed in accordance with the present invention.
Figure 2:
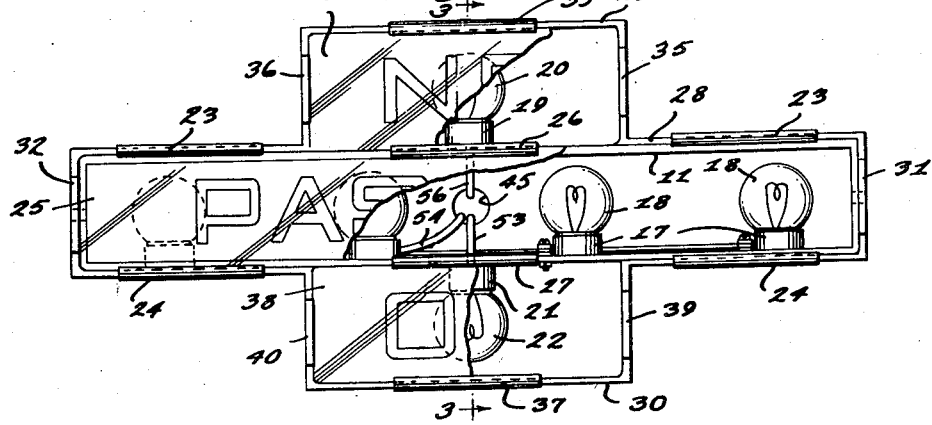
Figure 2 is an elevational view, with parts broken away, of the signal unit of Figure 1 with its outer housing removed.
Figure 3:
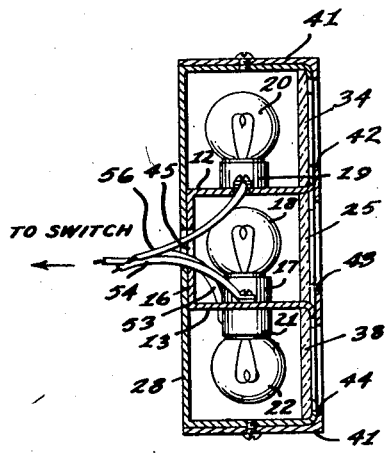
Figure 3 is a cross-sectional view taken on line 3—3 of Figure 2.
Figure 8:
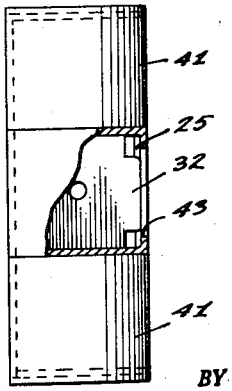
Figure 8 is an end elevational view, partly in cross-section of the completely housed signal unit of Figure 1.

Referring to the drawings, 11 designates the main inner body of the signal device, said inner body comprising a rectangular housing having a top wall 12, a bottom wall 13, end walls 14 and 15 and a rear wall 16. Secured to bottom wall 13 inside the housing are a plurality of sockets 17

2 in which are positioned lamps 18. Secured to the central portion of the top wall 12 at the top of the housing is a socket 19 in which is positioned a lamp 20. Secured to the central portion of the bottom wall 13 and projecting below the housing is a socket 21 in which is positioned a lamp 22. The forward edges of top and bottom walls 12 and 13 are provided with inwardly opposed pairs of clips 23 and 24 adapted to receive a lens 25 marked "Passing." At the intermediate portions of said forward edges are outwardly directed clips 26 and 27.

Telescoped on and secured to the main inner body 11 of the signal device is a shell member 28 having upper and lower rectangular enclosures 29 and 30 respectively enclosing the lamps 20 and 22. The end walls of the shell member 28 are formed with respective tabs 31 and 32 which prevent the lens 25 from sliding laterally. The top wall of enclosure 29 is formed at its front edge with a clip 33 opposing clip 26, and a lens 34 marked "No" is secured in the clips 33 and 26. The end walls of enclosure 29 are provided with respective tabs 35 and 36 which prevent the lens 34 from sliding laterally. The bottom wall of enclosure 30 is formed at its forward edge with a clip 37 opposing clip 27, and a lens 38 marked "OK" is secured in the clips 37 and 27. The end walls of enclosure 30 are provided with tabs 39 and 40 which prevent the lens 38 from sliding laterally.

Telescoped over and secured to the above described assembly is an outer shell 41 formed with respective windows 42, 43 and 44 framing the respective "No," "Passing" and "OK" indicia. The entire unit above described is suitably secured to the rear portion of a motor vehicle.

The rear wall 16 is formed with an aperture 45 for admitting the wire connections to the lamp sockets 17, and additional openings 46 and 47 are provided in the respective top and bottom walls 12 and 13 for connecting wires to the sockets 19 and 21.

Secured to the dashboard 48 of the vehicle is a channel member 49 in which are secured spaced contact strips 50, 51 and 52, said contact strips being suitably insulated from the surface of the channel member. Contact strip 50 is connected to lamp 22 through socket 21 by a wire 53. Contact strip 51 is connected to the lamps 18 through the sockets 17 by a wire 54 and branch wires 55. Contact strip 52 is connected to lamp 20 through socket 19 by a wire 56.

Secured to the dashboard 48 by suitable insulating means is a first spring member 57 overlying and normally spaced from the contact strips 50 and 51. Slidably secured in dashboard 48 adjacent member 57 is a push button 58. When button 48 is pushed, it moves spring member 57 into bridging engagement with contact strips 50 and 51. A similar spring member 59 is secured by suitable insulating means to the dashboard overlying and normally spaced from the contact strips 51 and 52. A push button 60 similar to button 58 is slidably carried by the dashboard adjacent spring member 59, and when push button 60 is pushed, it moves spring member 59 into bridging engagement with said contact strips 51 and 52. The respective spring members 57 and 59 are connected by wires 61 and 62 to the positive terminal of the vehicle battery 63. The negative battery terminal is grounded.

When button 60 is pressed, it energizes lamps 18 and lamp 20 simultaneously, giving the "No Passing" signal to a vehicle in the rear intending to pass, as where road conditions ahead are unsafe for passing. When button 58 is pressed, it energizes lamps 18 and lamp 22 simultaneously giving the "Passing OK" signal to the vehicle in the rear, as where road conditions are safe for passing. Therefore, when the driver in the rear vehicle signals by blowing his horn or the like that he wishes to pass, the driver ahead can easily flash the appropriate signal indicating whether road conditions ahead are either unsafe or safe for passing. Passing hazards are thereby greatly reduced.

While a specific embodiment of a motor vehicle passing signal device has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a motor vehicle signal device, an inner rectangular housing, a plurality of lamps inside said inner housing, a lamp carried on the top wall of the housing externally thereof, a lamp carried by the bottom wall of the housing externally thereof, clip means carried by the forward edges of said top and bottom walls, a lens secured in said clip means, a shell telescoped on said inner housing and formed with means defining a top enclosure receiving the lamp on the top wall of the housing and a bottom enclosure receiving the lamp carried by the bottom wall of the housing, additional clip means carried by the forward edges of enclosure-defining means and the housing top and bottom walls, and respective lenses for the top enclosure and the bottom enclosure secured in said additional clip means.

2. In a motor vehicle signal device, an inner rectangular housing, a plurality of lamps inside said housing, a lamp carried on the top wall of the housing externally thereof, a lamp carried by the bottom wall of the housing externally thereof, opposed clips carried by the forward edges of said top and bottom walls, a lens secured in said opposed clips and covering the housing, a shell telescoped on said inner housing and formed with a top enclosure receiving the lamp on the top wall of the housing and a bottom enclosure receiving the lamp carried by the bottom wall of the housing, tabs projecting from the side edges of the shell preventing said lens from sliding laterally, additional clip means carried by the top wall of the top enclosure and the housing top wall, a second lens secured in said additional clip means and covering the top enclosure, further clip means carried by the bottom wall of the bottom enclosure and the housing bottom wall, and a third lens secured in said further clip means and covering the bottom enclosure.

3. In a motor vehicle signal device, an inner rectangular housing, a plurality of lamps inside said housing, a lamp carried on the top wall of the housing externally thereof, a lamp carried by the bottom wall of the housing externally thereof, opposed clips carried by the forward edges of said top and bottom walls, an indicia-bearing lens secured in said opposed clips and covering the housing, a shell telescoped on said inner housing and formed with a top rectangular enclosure receiving the top lamp and a bottom rectangular enclosure receiving the bottom lamp, tabs projecting from the side edges of the shell preventing the lens from sliding laterally, additional clip means carried by the top wall of the top enclosure and the housing top wall, a second indicia-bearing lens secured in said additional clip means and covering the top enclosure, further clip means carried by the bottom wall of the bottom enclosure and the housing bottom wall, a third indicia-bearing lens secured in said further clip means and covering the bottom enclosure, and tabs projecting from the side walls of the top and bottom enclosures preventing said second and third lens from sliding laterally.

DAVID H. SMITH, JR.

REFERENCES CITED

The following references are of record in the file of this patent:

UNITED STATES PATENTS

| Number | Name | Date |
|---|---|---|
| 1,279,159 | Riggs | Sept. 17, 1918 |
| 1,732,165 | Kelly | Oct. 15, 1929 |
| 1,733,885 | Katt | Oct. 29, 1929 |
| 1,854,699 | Johnson | Apr. 19, 1932 |
| 2,044,300 | Heans | June 16, 1936 |